United States Patent
Knutsen et al.

(10) Patent No.: US 9,515,945 B2
(45) Date of Patent: Dec. 6, 2016

(54) METHODS AND SYSTEMS FOR DYNAMIC SPEED CHANGE ON HIGH SPEED INTERCONNECTS

(71) Applicant: ST-Ericsson SA, Plan-les-Ouates (CH)

(72) Inventors: Rune Knutsen, Nedenes (NO); Ken Henry Andersen, Homborsund (NO); Sjur Brendeland, Grimstad (NO); Kjell Heimdal, Grimstad (NO); Geir Jevne, His (NO); Daniel Martensson, Grimstad (NO); Tryggve Mikkelsen, Lillesand (NO)

(73) Assignee: ST-ERICSSON SA, Plan-les-Ouates (CH)

( * ) Notice: Subject to any disclaimer, the term of this patent is extended or adjusted under 35 U.S.C. 154(b) by 109 days.

(21) Appl. No.: 14/401,181

(22) PCT Filed: May 27, 2013

(86) PCT No.: PCT/EP2013/060849
§ 371 (c)(1),
(2) Date: Nov. 14, 2014

(87) PCT Pub. No.: WO2013/186034
PCT Pub. Date: Dec. 19, 2013

(65) Prior Publication Data
US 2015/0131557 A1    May 14, 2015

Related U.S. Application Data

(60) Provisional application No. 61/660,263, filed on Jun. 15, 2012.

(30) Foreign Application Priority Data

Sep. 20, 2012   (EP) ................................ 12185130

(51) Int. Cl.
*H04L 12/873*     (2013.01)
*H04L 1/00*       (2006.01)
(Continued)

(52) U.S. Cl.
CPC ............. *H04L 47/52* (2013.01); *H04L 1/0002* (2013.01); *H04L 1/0023* (2013.01);
(Continued)

(58) Field of Classification Search
None
See application file for complete search history.

(56) References Cited

U.S. PATENT DOCUMENTS 7,558,874 B1 * 7/2009 Kodukula ........... H04L 43/0894
                                                      709/233
RE44,804 E * 3/2014 Osborn ................. G06F 1/3203
                                                      702/146
(Continued)

FOREIGN PATENT DOCUMENTS

WO     2004/114549 A1    12/2004

OTHER PUBLICATIONS

International Search Report issued in corresponding International application No. PCT/EP2013/060849, date of mailing Aug. 2, 2013.
(Continued)

*Primary Examiner* — Anh Ngoc Nguyen
(74) *Attorney, Agent, or Firm* — Patent Portfolio Builders PLLC

(57) ABSTRACT

Methods of changing a data rate of communication over an interface between a data transmitter and a data receiver are disclosed, wherein the data transmitter is associated with a first processor and transmitting data over the interface and the data receiver is associated with a second processor. The data transmitter transmits and the data receiver receives data over the interface at a first data rate. At the first processor,
(Continued)

it is determined to change the first data rate to a second data rate. The data transmitter transmits and the data receiver receives a request to change the first data rate to the second data rate. In response thereto, a response message is transmitted by the data receiver and received by the data transmitter. When the response message comprises an acknowledgement to change the first data rate to the second data rate, the data transmitter transmits and the data receiver receives data over the interface at the second data rate. Corresponding protocol, electronic circuit and electronic device are also enclosed.

14 Claims, 5 Drawing Sheets

(51) Int. Cl.
   *H04L 1/16* (2006.01)
   *H04L 5/14* (2006.01)
   *H04W 28/22* (2009.01)
(52) U.S. Cl.
   CPC .......... *H04L 1/1607* (2013.01); *H04L 5/1446* (2013.01); *H04W 28/22* (2013.01); *H04L 1/0025* (2013.01); *Y02B 60/31* (2013.01)

(56) References Cited

U.S. PATENT DOCUMENTS

| 2006/0107164 | A1  | 5/2006 | Baer et al. |
| 2008/0069006 | A1* | 3/2008 | Walter ................ H04L 41/5067 370/252 |
| 2009/0154365 | A1* | 6/2009 | Diab .................... H04L 1/0001 370/248 |
| 2013/0044595 | A1* | 2/2013 | Han .................. H04W 28/0242 370/230 |

OTHER PUBLICATIONS

Written Opinion of the International Searching Authority issued in corresponding International application No. PCT/EP2013/060849, date of mailing Aug. 2, 2013.

Extended European Search Report issued in corresponding European application No. EP 12 18 5130, date of completion of the search Sep. 8, 2014.

* cited by examiner

METHODS AND SYSTEMS FOR DYNAMIC SPEED CHANGE ON HIGH SPEED INTERCONNECTS

TECHNICAL FIELD

The present invention relates generally to digital circuits and more specifically to systems and methods associated with data transmission over an interface, such as e.g. a high speed interconnect, from a data transmitter associated with a first processor to a data receiver associated with a second processor.

BACKGROUND

Electronic devices, such as mobile phones, personal computers, personal digital assistants, and many others, utilize processors, memories, input/output (I/O) and other digital devices in order to provide their designed functionality to end users. These various digital devices are connected to one another using interconnects (also sometimes referred to as "busses" or "interfaces"), which convey data, signals and commands between or among the various devices, e.g., between processors.

Some interconnects, like many other electrical devices, are specified by standards. For example, in the Mobile Industry Processor Interface Alliance (MIPI), several standards are defined. One of these standards is called the MIPI Alliance Specification for High-Speed Synchronous Serial Interface (HSI) Physical Layer Version 1.01.00-September 2008. This standard documents the HSI interface, which is an interface designed to connect, for example, an application die to a cellular modem die in cellular handsets, but the HSI interface can also be used for other purposes. Various modem platforms in use today support the HSI standard as a modem interface for Inter Processor Communications (IPC). However, the HSI specification does not directly specify which speeds are supported on the interface, but instead discuss relative setup and hold time for the signals and that the receiver must support speeds between 1 and 100 Mbps. Moreover, there is no description of the protocol running on top of HSI and specifically no description of how the protocol shall be used to dynamically negotiate speeds on the link.

Accordingly, it would be desirable to provide methods, devices and systems for handling dynamic speed changes on HSI links.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to provide methods, protocols, devices and systems that support dynamic speed changes on interfaces between circuits and that thereby enable optimized or at least improve use of frequency-voltage operating points of the circuits.

According to a first aspect, this is achieved by a method for a data transmitter associated with a first processor and transmitting data over an interface to a data receiver associated with a second processor, where the method changes a data rate (speed) of the communication over the interface.

The method comprises transmitting data over the interface at a first data rate and determining to change the first data rate to a second data rate. A request to change the first data rate to the second data rate is transmitted to the data receiver and a response message is received from the data receiver. If the response message comprises an acknowledgement to change the first data rate to the second data rate, the method comprises transmitting data over the interface at the second data rate.

The first processor may, for example, comprise a modem circuit and the second processor may, for example, comprise an application processor, or vice versa. The interface may, for example, comprise an interconnect or a high speed interconnect, such as a High speed Synchronous serial Interface (HSI).

The first data rate is typically different from the second data rate. The first data rate may be lower than the second data rate or vice versa. Thus, the data rate change may be an increase or a decrease of data rate.

When the interface is powered on, a highest possible data rate is typically used as the initial first data rate. According to some embodiments, however, a data rate that is not the highest possible data rate may be used as the initial first data rate.

In some embodiments the method may comprise, after receiving the response message comprising an acknowledgement, reconfiguring the first processor to an operating point associated with the second data rate.

The operating point may define an operating frequency and an operating voltage of the first processor.

If the second data rate is lower than the first data rate, some embodiments comprise initiating transmitting data over the interface at the second data rate before transmitting the request.

If the second data rate is higher than the first data rate, some embodiments comprise initiating transmitting data over the interface at the second data rate after receiving the acknowledgement.

According to some embodiments, the method may further comprise monitoring an actual transmitted data per time unit and comparing the actual transmitted data per time unit with one or more data rate thresholds. In these embodiments, the determination to change the first data rate to a second data rate may be based on the comparison. The actual transmitted data per time unit may, for example, be monitored as a momentary value, an average value over a time window, or a filtered value.

According to some embodiments, the method may further comprise monitoring a transmission queue size and comparing transmission queue size with one or more transmission queue thresholds. In these embodiments, the determination to change the first data rate to a second data rate may be based on the comparison. The transmission queue size may, for example, be monitored as a momentary value, an average value over a time window, or a filtered value.

In some embodiments, the method may further comprise pausing the data transmission between the transmission of the request and the reception of the response message.

If the response message comprises a non-acknowledgement to change the first data rate to the second data rate, the method according to some embodiments may comprise transmitting data over the interface at the first data rate.

A second aspect provides a method for a data receiver associated with a second processor and receiving data over an interface to from a data transmitter associated with a first processor, where the method changes a data rate (speed) of the communication over the interface.

The method comprises receiving data over the interface at a first data rate, receiving (from the data transmitter) a request to change the first data rate to the second data rate, and transmitting a response message to the data transmitter.

If the response message comprises an acknowledgement to change the first data rate to the second data rate, the method comprises receiving data over the interface at the second data rate.

If the second data rate is lower than the first data rate the method may further comprise, after transmitting the acknowledgement, reconfiguring the second processor to an operating point associated with the second data rate.

If the second data rate is higher than the first data rate the method may further comprise, before transmitting the acknowledgement, reconfiguring the second processor to an operating point associated with the second data rate.

The operating point may define an operating frequency and an operating voltage of the second processor.

In some embodiments, the method may further comprise receiving data over the interface at the first data rate if the response message comprises a non-acknowledgement to change the first data rate to the second data rate.

A third aspect is a computer program product comprising a computer readable medium, having thereon a computer program comprising program instructions. The computer program is loadable into a data-processing unit and adapted to cause execution of a method according to any of the first and second aspects when the computer program is run by the data-processing unit.

According to a fourth aspect, a protocol is provided for a data transmitter associated with a first processor and a data receiver associated with a second processor, the data transmitter transmitting data over an interface to the data receiver. The protocol is adapted for changing a data rate of communication over the interface.

The protocol comprises a first communication mode adapted to support transmission of data over the interface at a first data rate and a second communication mode adapted to support transmission of data over the interface at a second data rate.

The protocol also comprises a request message adapted to be transmitted by the data transmitter and received by the data receiver, and adapted to request a change of the first data rate to the second data rate.

Furthermore, the protocol comprises a response message adapted to the transmitted by the data receiver and received by the data transmitter in response to the request message. The response message comprises one of an acknowledgement adapted to grant the change of the first data rate to the second data rate and a non-acknowledgement adapted to deny the change of the first data rate to the second data rate.

The protocol may be a link communication protocol.

A fifth aspect provides an electronic circuit comprising a processor and an interface port connectable to an interface and adapted to support communication according to the protocol the fourth aspect.

The electronic circuit also comprises a data transmitter and a data receiver, connectable to a transmission link and a reception link respectively of the interface and adapted to communicate according to the protocol of the fourth aspect over the interface.

The electronic circuit further comprises a determiner associated with the data transmitter and adapted to determine to change a data rate of the transmission link from the first data rate to the second data rate.

The electronic circuit may, for example, be an electronic chip such as a modem or an application processor.

According to some embodiments, the electronic circuit may further comprise a memory adapted to store the first data rate in association with an operating point associated with the first data rate and the second data rate in association with an operating point associated with the second data rate.

The operating point may define an operating frequency and an operating voltage of the second processor.

A sixth aspect is an electronic device comprising first and second electronic circuits according to the fifth aspect and an interface between the first electronic circuit and the second electronic circuit, wherein the interface is adapted to support communication according to the protocol of the fourth aspect.

The electronic device may be a wireless communication device according to some embodiments, the first electronic circuit may be a modem and the second electronic circuit may be an application processor.

In some embodiments, the third, fourth, fifth and sixth aspects may additionally have features identical with or corresponding to any of the various features as explained above for the first and second aspects.

According to an embodiment, a method for changing a speed of communication on an HSI interconnect comprises the steps of: transmitting data, by a transmitter associated with a first processor toward a receiver associated with a second processor, over the HSI interconnect at a first HSI speed; determining, by the transmitter, that the first HSI speed should be increased or decreased, sending, by the transmitter, a request toward the receiver to change the first HSI speed to a second HSI speed, the first HSI speed being different than the second HSI speed, receiving, by the transmitter, an acknowledgement from the receiver, and transmitting data from the transmitter toward the receiver over the HSI interconnect at the second HSI speed.

According to another embodiment, a method for changing a speed of communication on an HSI interconnect comprises the steps of: transmitting data, by a transmitter associated with a first processor toward a receiver associated with a second processor, over the HSI interconnect at a first HSI speed which is selected from a list of HSI speeds stored in a memory associated with the first processor; determining, by the transmitter, that the first HSI speed should be increased or decreased, sending, by the transmitter, a request toward the receiver to change the first HSI speed to a second HSI speed which is also selected from the list, the first HSI speed being different than the second HSI speed, receiving, by the transmitter, an acknowledgement from the receiver, adjusting power levels associated with changing from the first HSI speed to the second HSI speed and transmitting data from the transmitter toward the receiver over the HSI interconnect at the second HSI speed.

According to other embodiments, devices can comprise at least one processor having a transmitter which is configured to perform the functions described in either of the two preceding paragraphs for communicating via an HSI interconnect.

An advantage of some embodiments is that dynamic change of data rate on an interconnection between electronic chips is provided. This enables optimal, or at least improved, utilization of the respective operating points of the electronic chips, because the data rate on the interconnection as well as the operating points may be dynamically adapted to the momentary communication needs. Thus, power consumption may be decreased since an operating point with the lowest suitable frequency-voltage pair may be chosen at each moment in time.

Another advantage of some embodiments is that maximum data throughput is still supported by the hardware, even though it may not be used at all times.

A further advantage of some embodiments is that the interconnection may produce less noise when running at a slower speed, and thus, lower noise on the average than a solution where the maximum data rate is used at all times. It may also be possible in some applications to dynamically adjust the pad drive strength to match the used data rate, which may reduce the noise even further. Reduced noise may, for example, improve the radio performance of a communication device.

BRIEF DESCRIPTION OF THE DRAWINGS

Further objects, features and advantages will appear from the following detailed description of embodiments, with reference being made to the accompanying drawings, in which:

FIG. 1A is a block diagram illustrating two devices (e.g. electronic circuits) which communicate via an interface and which can use a link protocol according to some embodiments to change communication speeds there between;

DETAILED DESCRIPTION

Figure 1A:
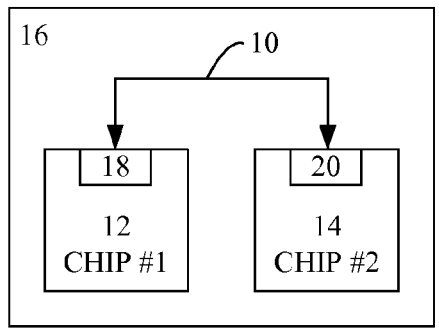

The following detailed description of some exemplary embodiments refers to the accompanying drawings.

In the following, embodiments will be described which are applicable to a situation where a data transmitter is associated with a first processor and transmitting data over an interface to a data receiver associated with a second processor.

One object of these embodiments is to provide for a way to dynamically change the data rate of the communication over the interface.

Operation according to some embodiments, for example in a wireless communication device, benefits from the fact that maximum radio data rates as defined in cellular standards are quite seldom experienced by end-users. Hence, there is seldom need for running the interface between circuits of the device on the highest possible data rate.

It should be understood that the following detailed description presents some example embodiments for illustrative purposes and that the specific details presented here below are not intended to limit the invention.

For example, HSI will be used as an example interface and a modem and an application processor will be used as example electronic circuits. Embodiments are, however, equally applicable to other interfaces and electronic circuits.

Furthermore, the rate change solutions are illustrated as applied to a situation where there is communication between two electronic circuits. It is noted, however, that embodiments may be equally applicable to a situation where the interface supports communication between more than two electronic circuits. For example, a plurality of electronic circuits may be interconnected via a single interface (e.g. a bus such as a ring bus or a serial communication bus). In such a situations a data rate change may be requested by one of the circuits (after having noted that it may be suitable) and a acknowledge response may be collected from all of the involved circuits before the change is completed. Other variants may also be applicable.

One problem with the current HSI specification is that it only partly covers power management. Some issues are solved by adding support for power-down of the link when there is no traffic flowing over the link. Setting the link speed on an HSI link is typically done based on the highest throughput performance requirement. This, however, does not provide an optimized solution for use-cases requiring small amounts of data or low bandwidth data over a long time period. In these types of situations, the link will not be powered down and the speed will typically be set much higher than what is required. This typically results in that the two Central Processing Units (CPU) interconnected via the HSI link running in a power mode higher than what is optimal.

Many modems and Application Processors (APs) support multiple Operating Performance Points (OPP, will also be referred to as Operating Points, OP), i.e., OPPs normally being combinations of a certain operating voltage and a certain operating frequency. Typically both a modem and an AP will be able to switch to a lower OPP if the HSI link speed is reduced. By introducing a mechanism for dynamically adapting the HSI link speed to what is required for a given use-case, the benefit of the lower OPP's can be used to obtain a lowest possible system power consumption without any noticeable reduction in observed performance.

According to various embodiments, two interconnected devices or chips, e.g., both a modem and an AP find the optimal transmission speed based on the link data throughput. This speed determination process can be performed, for example, continuously, at various times or in response to pre-determined conditions. The modem can, for example, be responsible for controlling link speed in the modem-to-AP link direction and the AP scan, for example, be responsible for controlling the link speed in the opposite direction. The speed steps can be predefined and should typically be selected so that they match the OPP steps in the modem and the AP.

In order to provide some context for discussion of the exemplary embodiments, some information is first provided relating to devices and systems in which these exemplary embodiments can be used. However it will be understood by those skilled in the art that exemplary embodiments can be used in other devices or systems.

FIG. 1A is a high level block diagram depicting two devices which communicate via an interconnect and which can use link protocols according to some embodiments to change communication speeds there between.

As generally shown in FIG. 1A, an HSI interconnect (or bus or interface) 10 can, for example, be used to connect groups, (e.g., pairs or other multiples) of devices (e.g., chips 12 (CHIP #1) and 14 (CHIP #2) which could, for example, be a modem and an application processor) within composite device or system 16, such as a mobile phone. Data packets which are conveyed over the interconnect or link 10 from, e.g., chip 12 to chip 14, can subsequently be routed to other destination chips or modules within the composite device 16 using a switch (not shown in FIG. 1A). The devices 12 and 14 can, in this exemplary embodiment, each include a suitable HSI interface 18 and 20.

Figure 1B:
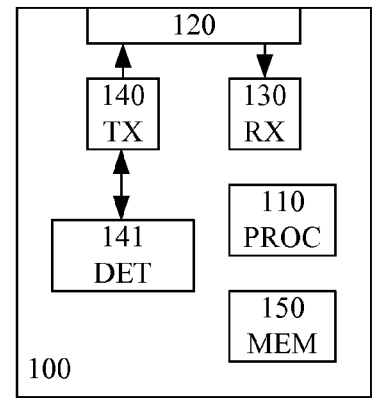
FIG. 1B is a block diagram illustrating a device (e.g. an electronic circuit) according to some embodiments.

FIG. 1B is a more detailed block diagram illustrating an electronic device (e.g. an electronic chip) 100 according to some embodiments of the invention. The electronic device 100 may, for example be arranged as one of the devices 12, 14 of FIG. 1A.

The device 100 comprises a processor (PROC) 110 for performing any applicable operations and/or processing of data and a memory (MEM) 150 for storing of data and/or processing instructions associated with the operation of the processor 110. The memory may, for example, store a plurality of data rates in association with corresponding operating points of the electronic device 100. The operating point may typically define an operating frequency and an operating voltage of the processor 110 and/or the device 100.

For communication with other devices, the device 100 comprise an interface port 120 associated with a receiver (RX) 130 and a transmitter (TX) 140. The transmitter is further associated with a determiner (DET) 141 adapted to monitor the data utilization of the transmission link of the interface and determine (based on the result of the monitoring) whether or not a change (increase or decrease) of the data rate it to be attempted.

Figure 2:
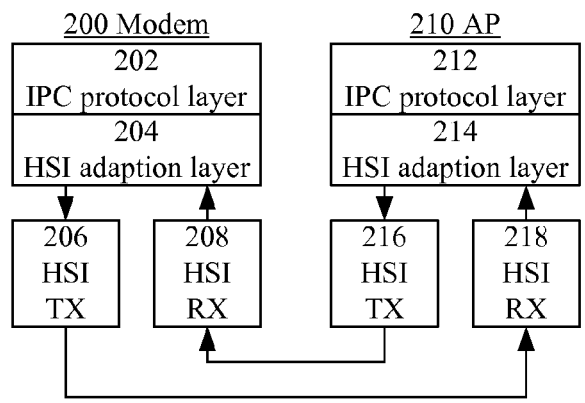
FIG. 2 is a schematic diagram illustrating a specific device interconnection architecture according to some embodiments.
Figure 3:
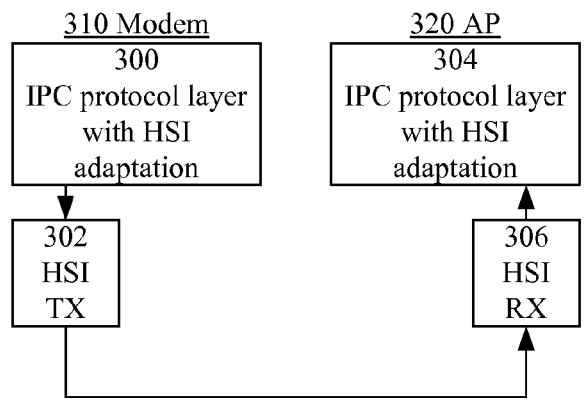
FIG. 3 is a schematic diagram illustrating a generalized version of FIG. 2 according to some embodiments.

FIG. 2 shows a more specific device interconnection architecture, relative to FIG. 1A, in which embodiments can be implemented and FIG. 3 is a generalized version of FIG. 2 in which embodiments can be implemented.

FIG. 2 shows the general system components of FIG. 1A from another perspective, i.e., when HSI is used for an Internal Processor Communication (IPC) communications link in a cellular phone context. Embodiments described herein, however, apply to all HSI links having a protocol layer, regardless of application, but cellular phones is a common usage. Therein, a modem 200 includes an IPC protocol layer 202 and an HSI adoption layer 204. An HSI transmit (TX) function 206 enables the modem 200 to transmit data over the interconnect, while an HSI receive (RX) function 208 enables the modem 200 to receive data over the interconnect. Similarly, the Application Processor (AP) 210 includes an associated IPC protocol layer 212, an HSI adaption layer 214, an HSI TX function 216 and an HSI RX function 218.

Since HSI can be separated into a transmitter and a receiver on each side, this description will use a simplified model of FIG. 2, having a single communication direction, as shown in FIG. 3 from which to describe embodiments associated with speed changing below, although it will be appreciated that the embodiments area are also intended for use in bidirectional communications. Moreover, it will be appreciated by those skilled in the art that the below-described embodiments are equally applicable to the architectures as described in any of FIGS. 1A, 1B, 2 and 3 and, indeed, to other architectures.

In FIG. 3, there is a transmitter 302 (comprising corresponding IPC protocol layer and HSI adaptation 300) on the modem side 310 of the figure and a receiver 306 (comprising corresponding IPC protocol layer and HSI adaptation 304) on the AP side 320. Some embodiments described herein use a symmetrical protocol allowing "transmitter" and "receiver" to be valid for both device, e.g., the modem and the AP.

In example embodiments, each transmitter side 310 has a list of HSI speeds to select from which is, e.g., stored in a memory device. The speeds set forth in the list are typically all speeds which are possible to use toward the receiver side 320 and there are at least two different speeds set forth in the list, but there can be more than two different speeds set forth in the list of communication speeds (or rates).

According to an embodiment, the transmitter side 310 starts its communications with the receiver side 320 over the HSI interconnect using the highest speed set forth in the list after link power-up, provided that that speed is one of the legitimate, usable speeds also for the receiver side 320.

The transmitter side 310 supervises the actual transmitted data speed and the size of the transmit queues, e.g., periodically or continuously. If the actual transmit speed of the communications over the interconnect is lower than (or equal to) a lower HSI speed in the list (compared to the currently used speed from the list, e.g. the nearest lower HSI speed) and, optionally, this has been true for a given time, the transmitter side 310 may initiate a request for lower HSI speed. On the other hand, if the transmit queues are above a certain size limit, e.g., for a given time, the transmitter may initiate a request for higher HSI speed. If there are no adequate (higher or lower as applicable) speeds to use in the list, than the currently used speed, then the transmitter side 310 may typically not request any HSI speed change according to an embodiment.

Figure 4:
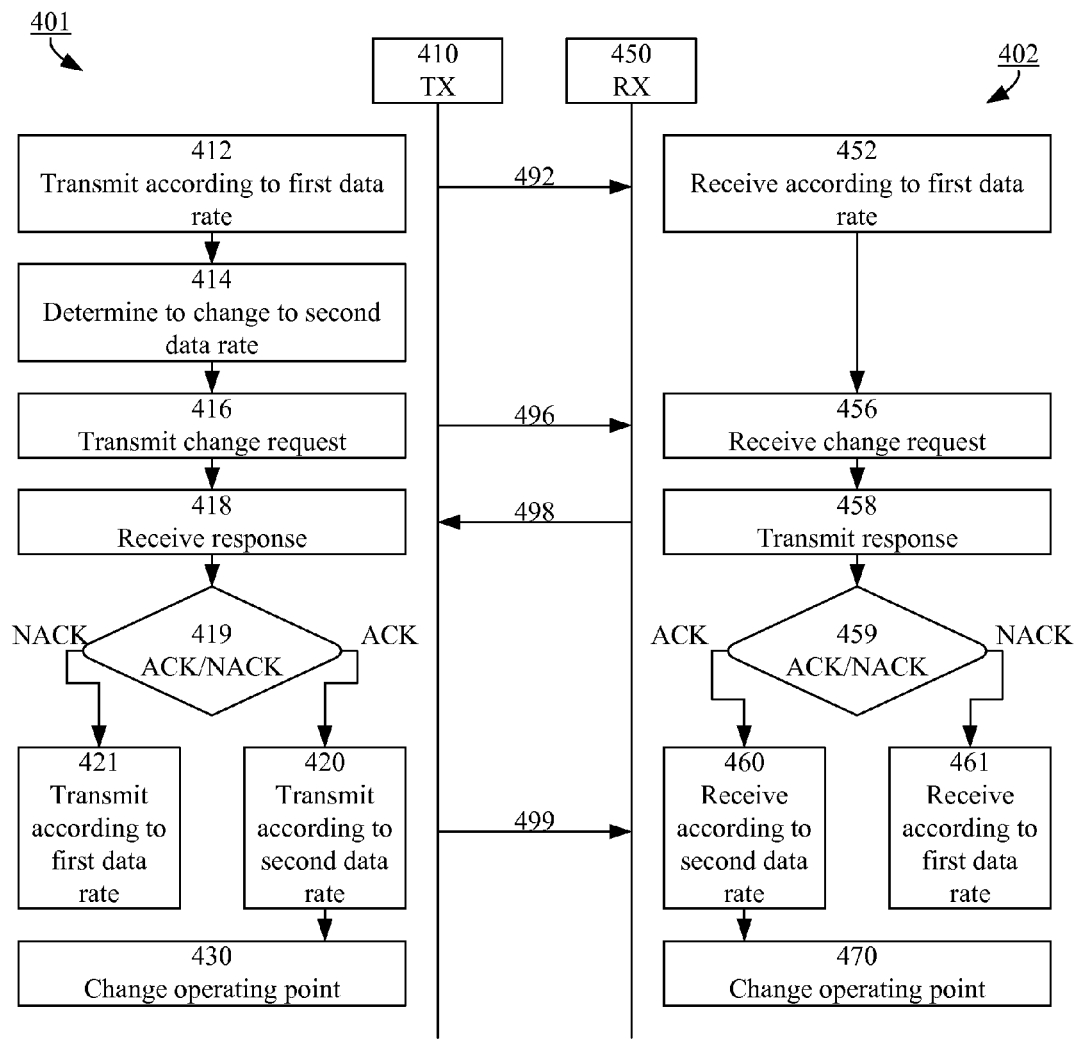
FIG. 4 is a combined signaling diagram and flowchart illustrating example method steps and signaling according to some embodiments.

FIG. 4 illustrates an example method 401 that may be performed by a transmitter side (TX) 410 and an example method 402 that may be performed by a receiver side (RX) 420 along with signaling that may be exchanged between the transmitter and receiver sides during a data rate change procedure. The methods and signaling described in FIG. 4 may, for example, be executed by the devices and interconnects as described in connection to any of FIGS. 1A, 1B, 2 and 3.

To start with, the transmitter side transmits data to the receiver side according to a first data rate, and the receiver side receives data from the transmitter side according to a first data rate, as illustrated by blocks 412, 452 and by signal 492.

In 414, the transmitter side determines to attempt a data rate change, for the first data rate to a second data rate (that may be higher or lower than the first data rate). The determination may, for example be based on a monitoring of the actual data rate utilization of the transmission link and/or the size of the transmission queue, as mentioned before.

The actual data rate (momentary, averaged, filtered, etc) may be compared to a data rate threshold that corresponds to the nearest lower data rate, or it may be compared to a plurality of thresholds that each correspond to a possible data rate. If the comparison shows that the actual data rate is lower than a threshold, it may be determined to change to the data rate corresponding to that threshold.

The transmission queue size (momentary, averaged, filtered, etc) may be compared to a transmission queue threshold that is associated with the nearest higher data rate, or it may be compared to a plurality of thresholds that each correspond to a possible data rate. The association may be such that if the higher data rate was used, the transmission link should have been able to accommodate the data amount corresponding to the transmission queue threshold value. If the comparison shows that the transmission queue is higher than a threshold, it may be determined to change to the data rate corresponding to that threshold. Alternatively, if the comparison shows that the transmission queue is higher than a first threshold and lower than a second threshold, it may be determined to change to the data rate corresponding to the second threshold.

After the determination of 414, the transmission side transmits a data rate change request 496 which is received by the receiver side as illustrated by blocks 416 and 456. The request message 496 may comprise only a request to increase or decrease the data rate, in which case it may be implicit that the change is to the nearest higher or lower data rate possible. Optionally, the request message 496 may also comprise an indication of the requested data rate.

Then, the receiver side transmits a response message 498 which is received by the transmission side as illustrated by blocks 458 and 418. The response message may comprise and an acknowledgement (ACK) of the data rate change if the change is accepted by the receiver side, and it may comprise a non-acknowledgement (NACK) of the data rate change if the change is not accepted by the receiver side. Whether or not the receiver side accepts the change request may, for example, depend on the available operating points of the receiver side.

If the data rate change was not accepted by the receiver side (NACK path out of blocks 419 and 459), communication is continued using the first data rate as illustrated by blocks 421 and 461.

If the data rate change was accepted by the receiver side (ACK path out of blocks 419 and 459), communication is continued using the new (second) data rate as illustrated by blocks 420 and 460 and by signal 499. In such a case, it may also be possible for the transmission and/or receiver side to change operating point to one which is more suitable for the second data rate, as is illustrated by blocks 430 and 470. It should be noted that the operations of blocks 420 and 430 may be performed in parallel, in the opposite order and even before some of the other steps of the method 401 according to various embodiments. Similarly, the operations of blocks 460 and 470 may be performed in parallel, in the opposite order and even before some of the other steps of the method 402 according to various embodiments. A few examples illustrating this will be given in the following.

Figure 5A:
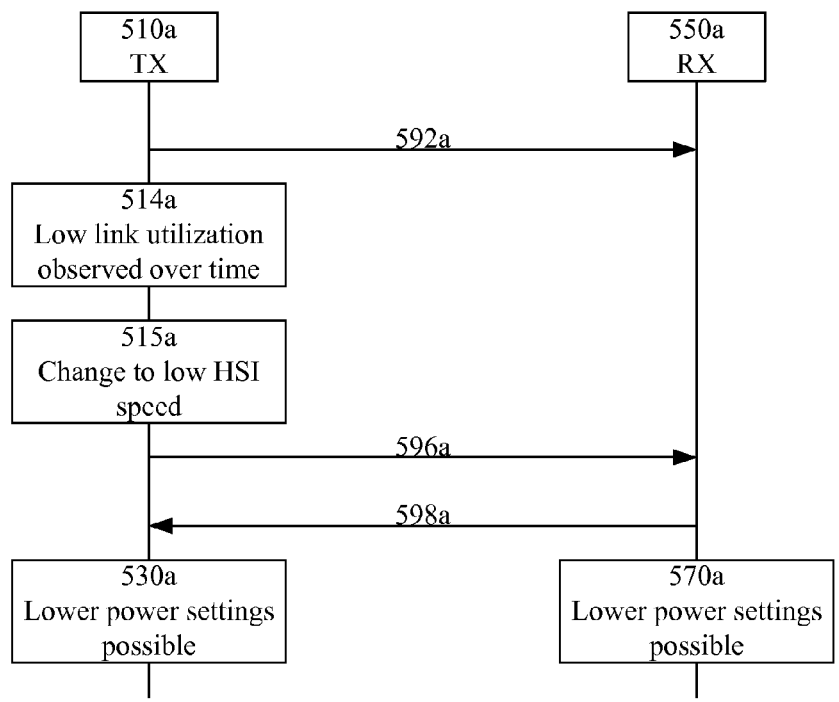
FIG. 5A is a signaling diagram illustrating example signaling according to some embodiments.

FIG. 5A shows exemplary signaling associated with reducing communication speed on an HSI link according to an embodiment.

FIG. 5A shows the case where the transmitter 510a has initially started to transmit data toward the receiver 550a using a high HSI speed over the interconnect, as shown by arrow 592a. The transmitter 510a determines that the HSI speed should be reduced, e.g., due to low link utilization being observed by the transmitter 510a over time, 514a. Accordingly, the transmitter 510a initiates a process to reduce the HSI speed and changes the transmission speed to a lower HSI speed, as shown by block 515a, and then the transmitter 510a sends a request 596a to the receiver 550a to agree on using the lower HSI speed. The request 596a may be sent using control commands in the protocol layer on top of HSI. Payload clients located above this layer typically does not see this traffic.

The receiver sends a response message 598a. If the receiver 550a is not capable of receiving data on the lower speed it responds with a non-acknowledgement. If the receiver 550a is capable of receiving data on the new lower speed, which was requested by the transmitter 510a, the receiver 550a can, according to an embodiment, respond with either acknowledge message or a not-acknowledge message to the speed change request. If the receiver 550a responds with not-acknowledge, the transmitter 510a reverts back to the previously used HSI speed (or not change from the initial speed for embodiments where block 515a is located after response message reception). If the receiver 550a responds with acknowledge to the HSI speed change request, then the new HSI speed is established and both sides can adjust to the optimal power settings (e.g. a suitable voltage-frequency pair) for the new HSI speed as shown by blocks 530a and 570a.

Figure 5B:
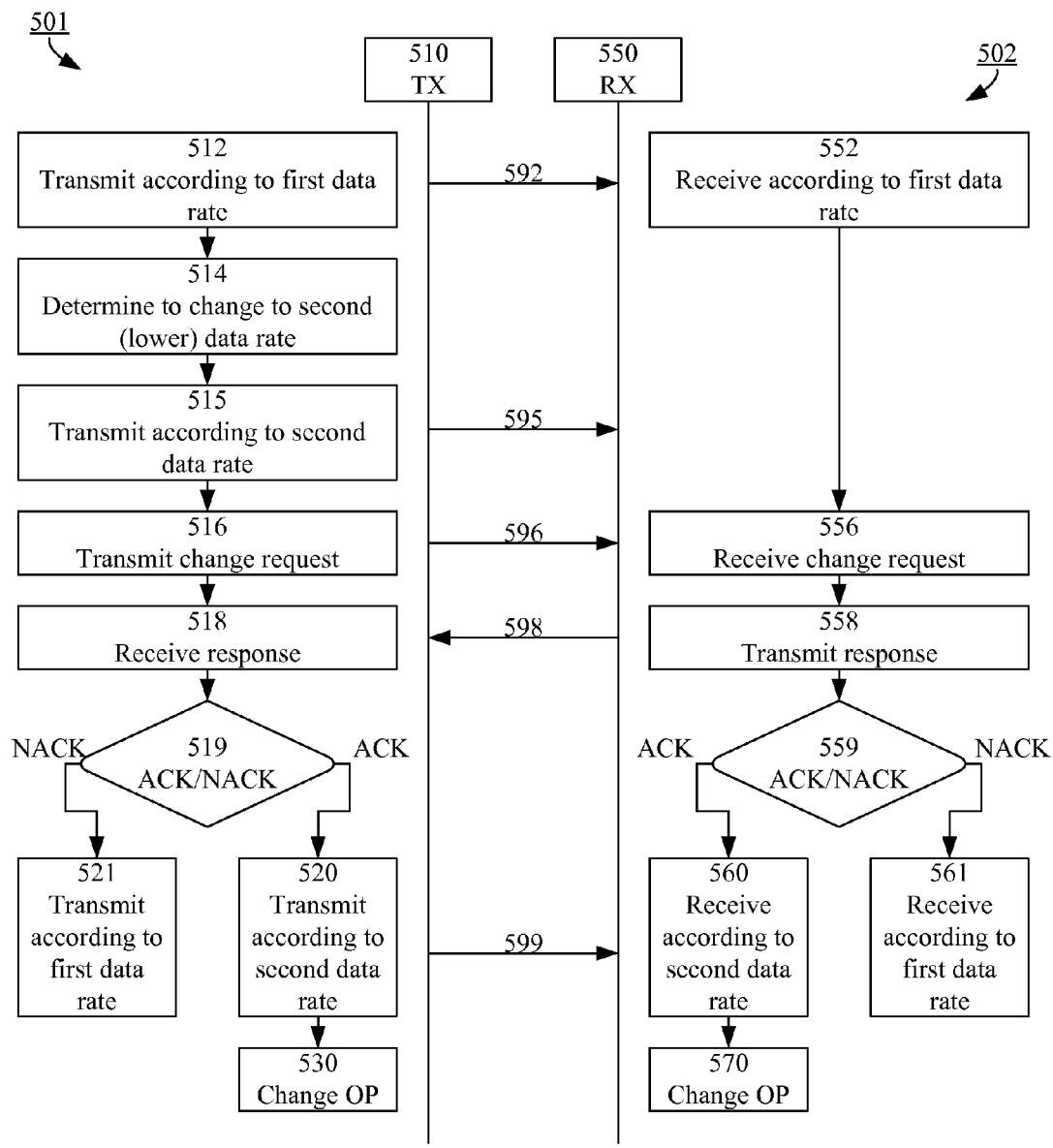
FIG. 5B is a combined signaling diagram and flowchart illustrating example method steps and signaling according to some embodiments.

FIG. 5B illustrates an example method 501 that may be performed by a transmitter side (TX) 510 and an example method 502 that may be performed by a receiver side (RX) 520 along with signaling that may be exchanged between the transmitter and receiver sides during a data rate change procedure. The methods and signaling described in FIG. 5B may, for example, be executed by the devices and interconnects as described in connection to any of FIGS. 1A, 1B, 2 and 3, and may be related to the scenario described in FIG. 5A.

To start with, the transmitter side transmits data to the receiver side according to a first data rate, and the receiver side receives data from the transmitter side according to a first data rate, as illustrated by blocks 512, 552 and by signal 592 (compare with 592a of FIG. 5A).

In 514, the transmitter side determines to attempt a data rate change, for the first data rate to a second data rate (that may be lower than the first data rate according to this embodiment—compare with 514a of FIG. 5A). The determination may, for example be based on a monitoring of the actual data rate utilization of the transmission link, as mentioned before.

The actual data rate (momentary, averaged, filtered, etc) may be compared to a data rate threshold that corresponds to the nearest lower data rate, or it may be compared to a plurality of thresholds that each correspond to a possible data rate. If the comparison shows that the actual data rate is lower than a threshold, it may be determined to change to the data rate corresponding to that threshold.

After the determination of 514, the transmission side starts using the second data rate in block 515 (compare with 515a of FIG. 5A). Then, the transmission side transmits a data rate change request 596 (compare with 596a of FIG. 5A) which is received by the receiver side as illustrated by blocks 516 and 556. The request message 596 may comprise only a request to decrease the data rate, in which case it may be implicit that the change is to the nearest lower data rate possible. Optionally, the request message 596 may also comprise an indication of the requested data rate.

Then, the receiver side transmits a response message 598 (compare with 598a of FIG. 5A) which is received by the transmission side as illustrated by blocks 558 and 518. The response message may comprise and an acknowledgement (ACK) of the data rate change if the change is accepted by the receiver side, and it may comprise a non-acknowledgement (NACK) of the data rate change if the change is not accepted by the receiver side.

If the data rate change was not accepted by the receiver side (NACK path out of blocks 519 and 559), communication is continued using the first data rate as illustrated by blocks 521 and 561. Thus, the transmission side changes back from the second data rate (applied by operations of block 515) to the first data rate.

If the data rate change was accepted by the receiver side (ACK path out of blocks 519 and 559), communication is continued using the new (second) data rate as illustrated by blocks 520 and 560 and by signal 599. In such a case, it may also be possible for the transmission and/or receiver side to change operating point (OP) to one which is more suitable for the second data rate, as is illustrated by blocks 530 and 570 (compare with 530*a* and 570*a* of FIG. 5A). It should be noted that the operations of blocks 560 and 570 may be performed in parallel, or in the opposite order.

Figure 6A:
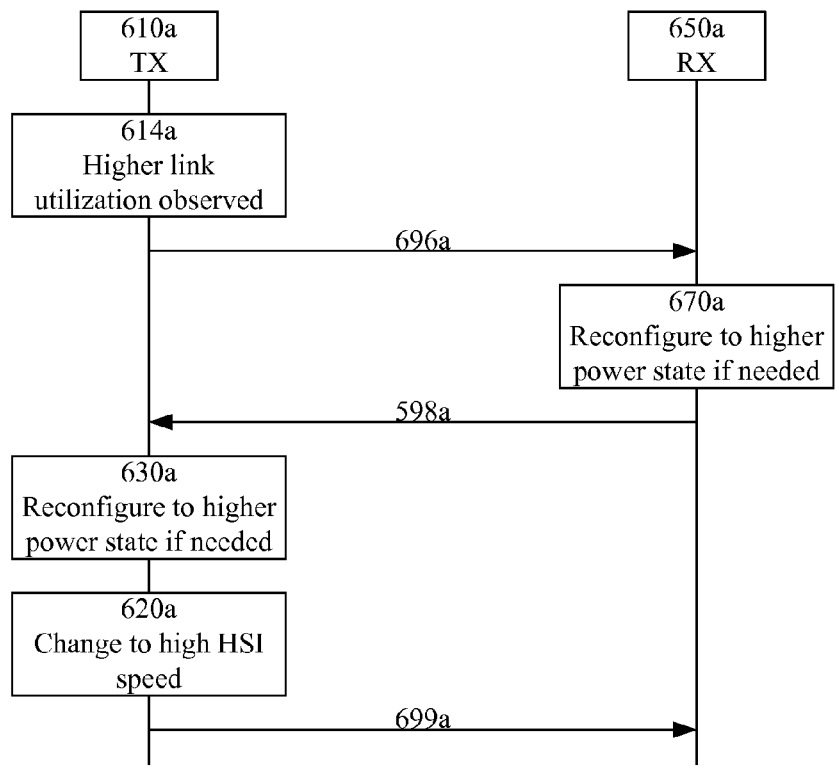
FIG. 6A is a signaling diagram illustrating example signaling according to some embodiments.

FIG. 6A shows exemplary signaling associated with increasing communication speed on an HSI link according to an embodiment.

FIG. 6A shows the case where the transmitter 610*a* has found that the HSI speed should be increased, i.e., from a lower speed in the list to a higher speed in the list. This decision may be based on an observation of a higher link utilization (e.g. via monitoring the transmission queue) as illustrated by block 614*a*. In this case the transmitter 610*a* sends the speed change request using the current HSI speed (i.e. without first changing to the new speed as in FIG. 5A) as shown by signal 696*a*. The receiver 650*a* can respond, for example, with either acknowledge or not-acknowledge as shown by message 698*a*. If the receiver 650*a* responds with not-acknowledge, then the transmitter 610*a* will not switch to the higher HSI speed for communications over the link. If the receiver 650*a* responds with an acknowledgement, then the receiver 650*a* may prepare itself for receiving the new higher speed and adjust to the optimal power settings (e.g. a suitable voltage-frequency pair) for the new HSI speed already before transmitting the response (as indicated by block 670*a*). At this point in time the transmitter 610*a* can increase the HSI speed and adjust to the optimal power settings (e.g. a suitable voltage-frequency pair) for the new HSI speed as shown by blocks 630*a*, 620*a* and signal 699*a*.

Figure 6B:
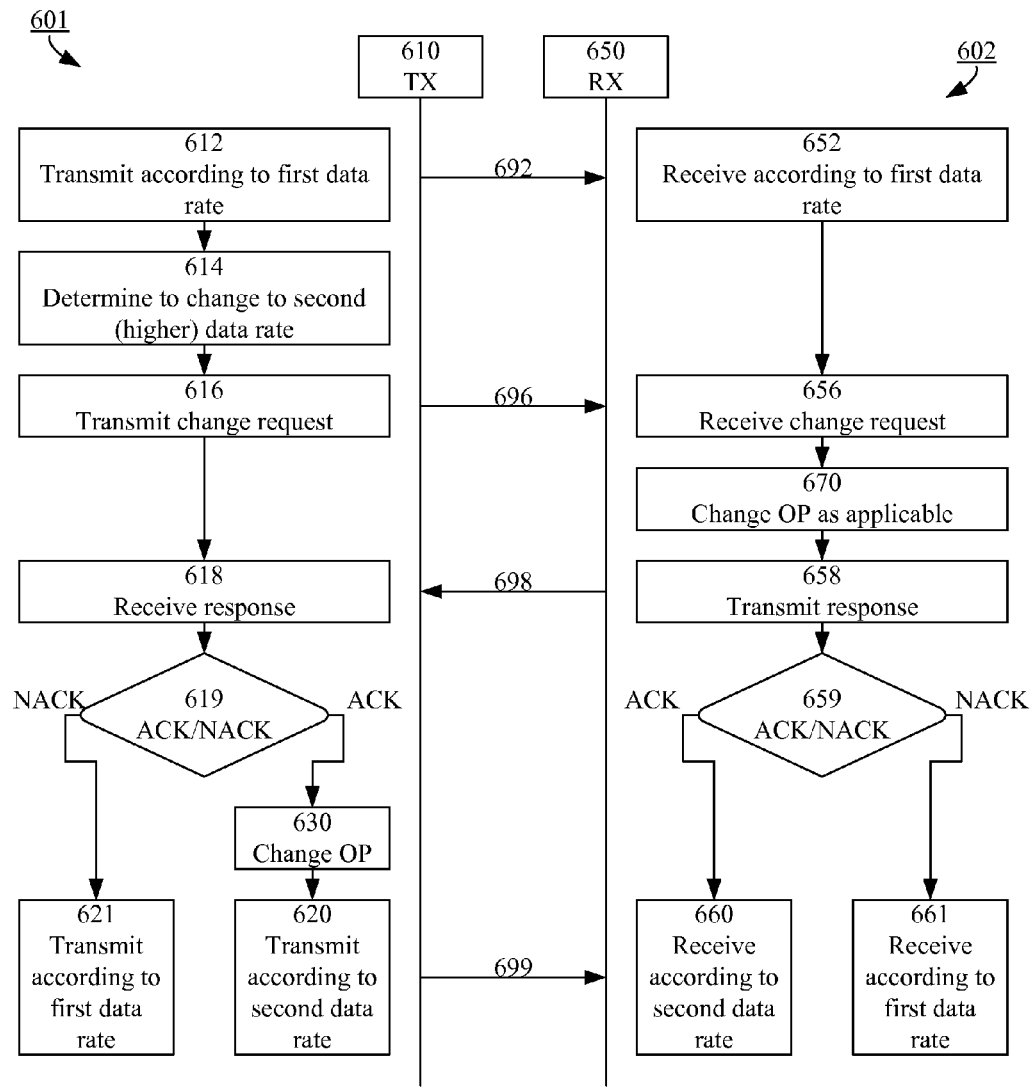
FIG. 6B is a combined signaling diagram and flowchart illustrating example method steps and signaling according to some embodiments.

FIG. 6B illustrates an example method 601 that may be performed by a transmitter side (TX) 610 and an example method 602 that may be performed by a receiver side (RX) 620 along with signaling that may be exchanged between the transmitter and receiver sides during a data rate change procedure. The methods and signaling described in FIG. 6B may, for example, be executed by the devices and interconnects as described in connection to any of FIGS. 1A, 1B, 2 and 3, and may be related to the scenario described in FIG. 6A.

To start with, the transmitter side transmits data to the receiver side according to a first data rate, and the receiver side receives data from the transmitter side according to a first data rate, as illustrated by blocks 612, 652 and by signal 692.

In 614, the transmitter side determines to attempt a data rate change, for the first data rate to a second data rate (that may be higher than the first data rate according to this embodiment—compare with 614*a* of FIG. 6A). The determination may, for example be based on a monitoring of the transmission queue of the transmission link, as mentioned before.

The transmission queue size (momentary, averaged, filtered, etc) may be compared to a transmission queue threshold that is associated with the nearest higher data rate, or it may be compared to a plurality of thresholds that each correspond to a possible data rate. The association may be such that if the higher data rate was used, the transmission link should have been able to accommodate the data amount corresponding to the transmission queue threshold value. If the comparison shows that the transmission queue is higher than a threshold, it may be determined to change to the data rate corresponding to that threshold. Alternatively, if the comparison shows that the transmission queue is higher than a first threshold and lower than a second threshold, it may be determined to change to the data rate corresponding to the second threshold.

After the determination of 614, the transmission side transmits a data rate change request 696 (compare with 696*a* of FIG. 6A) using the first data rate which is received by the receiver side as illustrated by blocks 616 and 656. The request message 696 may comprise only a request to increase the data rate, in which case it may be implicit that the change is to the nearest higher data rate possible. Optionally, the request message 696 may also comprise an indication of the requested data rate.

Then, the receiver side transmits a response message 698 (compare with 698*a* of FIG. 6A) which is received by the transmission side as illustrated by blocks 658 and 618. The response message may comprise and an acknowledgement (ACK) of the data rate change if the change is accepted by the receiver side, and it may comprise a non-acknowledgement (NACK) of the data rate change if the change is not accepted by the receiver side.

If the data rate change was not accepted by the receiver side (NACK path out of blocks 619 and 659), communication is continued using the first data rate as illustrated by blocks 621 and 661.

If the data rate change was accepted by the receiver side (ACK path out of blocks 619 and 659), communication is continued using the new (second) data rate as illustrated by blocks 620 and 660 and by signal 699. In such a case, the receiver side may change operating point and prepare for reception according to the second data rate already before transmitting the response message. This is illustrated by block 670 (compare with 670*a* of FIG. 6A). The transmitter side first changes to an operating point which is more suitable for the second data rate as illustrated by block 630, then it starts transmission 699 using the second data rate in block 620 (compare with 630*a*, 620*a* and 699*a* of FIG. 6A).

Numerous additions, variations and modifications to the foregoing are contemplated by various embodiments. For example, according to some embodiments, the transmitter side (e.g. 310, 510, 610) can use a timer/timeout while waiting for response from the receiver side (e.g. 320, 550, 650). If the timer/timeout period expires without the transmitter having received a response to its request to increase or decrease the HSI link speed, the transmitter can assume that there is a communication error and the link can be restarted.

According to some embodiments, if the transmitter receives a not-acknowledge response on a speed change request, then the transmitter period can have a timeout period relating to how soon it may send a new speed change request.

According to some embodiments, one or more of the following options can be applied to the speed change sequences described herein. First, when the modem transmitter is waiting for a response on a speed change request, an option can be to disable all transmit data until the response is received. This will allow for the AP receiver to optimize the new power settings without the requirement that the HSI receiver shall be operational during this configuration. Note that this applies for one of the transmitters only (e.g. modem transmitter). If this option was applied to transmitters of both sides (e.g. also the AP transmitter), then a deadlock in the sequence would be possible if both sides requested a speed change at the same time.

As another option, the transmitter may be able to not request a new speed at all, but instead just change the HSI speed unilaterally. This option can, for example, be used in cases where the receiver will always be capable of receiving all possible speeds on the transmitter list and where there are no options for the receiver to save power by reducing the highest HSI receive speed. The transmitter can still optimize for power versus HSI speed locally.

The foregoing and other embodiments may provide, among other things, one or more of the following advantages (although it should be noted that these advantages are not required features of the foregoing embodiments).

One possible advantage is that one or both sides of the HSI link can optimize for power consumption by aligning OPP with maximum supported HSI speed.

Another possible advantage is that maximum throughput as supported by hardware (HW) is still supported since the algorithm of the embodiments will identify when the highest speed is needed. A small delay before switching speed may be experienced.

Yet another possible advantage is that maximum throughput from start-up (boot) is kept without any reduction compared to the HW support.

The HSI link will typically produce less noise when running at a slower speed, which is provided as another advantage. Furthermore, it may be possible to dynamically adjust pad drive strength matching the speed used. This will typically further reduce the noise. Reduced noise may improve radio performance when embodiments are applied to, e.g., mobile phones.

The described embodiments and their equivalents may be realized in software or hardware or a combination thereof. They may be performed by general-purpose circuits associated with or integral to a device (e.g. a communication device), such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a communicator, an electronic organizer, a smartphone, a computer, a notebook, an embedded drive, or a mobile gaming device.

Figure 7:
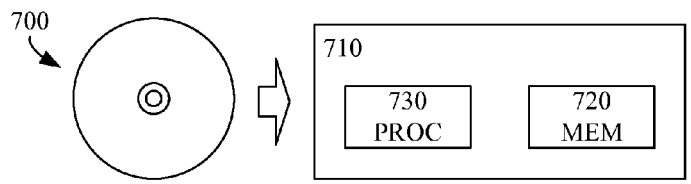
FIG. 7 is a schematic drawing illustrating a computer program product according to some embodiments.

According to some embodiments, a computer program product comprises a computer readable medium such as, for example, a diskette or a CD-ROM (such as the CD-ROM 700 illustrated in FIG. 7). The computer readable medium 700 may have stored thereon a computer program comprising program instructions. The computer program may be loadable into a data-processing unit 730, which may, for example, be comprised in a mobile terminal 710. When loaded into the data-processing unit 730, the computer program may be stored in a memory 720 associated with or integral to the data-processing unit 730. According to some embodiments, the computer program may, when loaded into and run by the data-processing unit 730, cause the data-processing unit to execute method steps according to, for example, the methods shown in any of the FIGS. 4, 5A, 5B, 6A and 6B.

The above-described exemplary embodiments are intended to be illustrative in all respects, rather than restrictive, of the present invention. Thus, the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method, for a data transmitter associated with a first processor and transmitting data over an interface to a data receiver associated with a second processor, of changing a data rate of communication over the interface, the method comprising:
    transmitting data over the interface at a first data rate;
    determining to change the first data rate to a second data rate;
    transmitting, to the data receiver, a request to change the first data rate to the second data rate;
    receiving a response message from the data receiver;
    after receiving the response message comprising an acknowledgement, reconfiguring the first processor to an operating point associated with the second data rate, wherein the operating point defines an operating frequency and an operating voltage of the first processor; and
    transmitting data over the interface at the second data rate when the response message comprises an acknowledgement to change the first data rate to the second data rate.

2. The method of claim 1, wherein the second data rate is lower than the first data rate and wherein transmitting data over the interface at the second data rate is initiated before transmitting the request.

3. The method of claim 1, wherein the second data rate is higher than the first data rate and wherein transmitting data over the interface at the second data rate is initiated after receiving the acknowledgement.

4. The method of claim 1, further comprising:
    monitoring an actual transmitted data per time unit; and
    comparing the actual transmitted data per time unit with one or more data rate thresholds, wherein determining to change the first data rate to a second data rate is based on the comparison.

5. The method of claim 1, further comprising:
monitoring a transmission queue size; and
comparing the transmission queue size with one or more transmission queue thresholds,
wherein determining to change the first data rate to a second data rate is based on the comparison.

6. The method of claim 1, further comprising:
pausing the data transmission between the transmission of the request and the reception of the response message.

7. The method of claim 1, further comprising:
transmitting data over the interface at the first data rate when the response message comprises a non-acknowledgement to change the first data rate to the second data rate.

8. A method, for a data receiver associated with a second processor and receiving data over an interface to and from a data transmitter associated with a first processor, of changing a data rate of communication over the interface, the method comprising:
receiving data over the interface at a first data rate;
receiving, from the data transmitter, a request to change the first data rate to the second data rate;
transmitting a response message to the data transmitter; and
receiving data over the interface at the second data rate when the response message comprises an acknowledgement to change the first data rate to the second data rate, the method further comprising
reconfiguring the second processor to an operating point associated with the second date rate, wherein the operating point defines an operating frequency and an operating voltage of the second processor, wherein
the second data rate is lower than the first data rate and the second processor is reconfigured after transmitting the acknowledgement, or
the second data rate is higher than the first data rate and the second processor is reconfigured before transmitting the acknowledgement.

9. The method of claim 8, further comprising:
receiving data over the interface at the first data rate when the response message comprises a non-acknowledgement to change the first data rate to the second data rate.

10. A computer program product comprising a non-transitory computer readable medium, having thereon a computer program comprising program instructions, the computer program being loadable into a data-processing unit and configured to cause execution of a method according to claim 1 when the computer program is run by the data-processing unit.

11. An electronic circuit comprising:
a processor;
an interface port connectable to an interface and configured to support communication according to a protocol comprising
a first communication mode configured to support transmission of data from the data transmitter to the data receiver over the interface at a first data rate;
a second communication mode configured to support transmission of data from the data transmitter to the data receiver over the interface at a second data rate;
a request message configured to be transmitted by the data transmitter and received by the data receiver, and configured to request a change of the first data rate to the second data rate;
a response message configured to the transmitted by the data receiver and received by the data transmitter in response to the request message, and comprising one of:
an acknowledgement configured to grant the change of the first data rate to the second data rate; and
a non-acknowledgement configured to deny the change of the first data rate to the second data rate;
a data transmitter connectable to a transmission link of the interface and configured to communicate, wherein the data transmitter is configured to transmit data over the interface at the second data rate when the response message comprises an acknowledgement to change the first data rate to the second data rate;
a data receiver connectable to a reception link of the interface and adapted configured to communicate; and
a memory configured to store the first data rate in association with an operating point associated with the first data rate and the second data rate in association with an operating point associated with the second data rate, wherein the operating points each define an operating frequency and an operating voltage of the of the processor.

12. An electronic device comprising:
a first electronic circuit according to claim 11;
a second electronic circuit; and
an interface between the first electronic circuit and the second electronic circuit.

13. The electronic device according to claim 12, wherein the electronic device is a wireless communication device, the first electronic circuit is a modem and the second electronic circuit is an application processor.

14. The method of claim 1, wherein
if the second data rate is lower than the first data rate data is transmitted over the interface at the second data rate before transmitting the request, and
if the second data rate is higher than the first data rate data is transmitted over the interface at the second data rate after receiving the acknowledgement.

* * * * *

UNITED STATES PATENT AND TRADEMARK OFFICE
CERTIFICATE OF CORRECTION

PATENT NO. : 9,515,945 B2  
APPLICATION NO. : 14/401181  
DATED : December 6, 2016  
INVENTOR(S) : Knutsen et al.

Page 1 of 1

It is certified that error appears in the above-identified patent and that said Letters Patent is hereby corrected as shown below:

In the Specification

In Column 7, Line 46, delete "adoption" and insert -- adaption --, therefor.

In Column 8, Lines 35-36, delete "receiver side (RX) 420" and insert -- receiver side (RX) 450 --, therefor.

In Column 10, Lines 14-15, delete "receiver side (RX) 520" and insert -- receiver side (RX) 550 --, therefor.

In Column 11, Lines 36-37, delete "receiver side (RX) 620" and insert -- receiver side (RX) 650 --, therefor.

In the Claims

In Column 15, Line 32, in Claim 8, delete "second date" and insert -- second data --, therefor.

In Column 16, Line 29, in Claim 11, delete "adapted configured" and insert -- configured --, therefor.

In Column 16, Line 35, in Claim 11, delete "of the of the" and insert -- of the --, therefor.

Signed and Sealed this  
Twenty-second Day of October, 2019

Andrei Iancu  
*Director of the United States Patent and Trademark Office*